United States Patent
Hong et al.

(10) Patent No.: US 10,597,306 B2
(45) Date of Patent: Mar. 24, 2020

(54) PHOTOCATALYTIC ROOFING GRANULES, PHOTOCATALYTIC ROOFING PRODUCTS, AND PROCESS FOR PREPARING SAME

(71) Applicant: CertainTeed Corporation, Malvern, PA (US)

(72) Inventors: Keith C. Hong, Northborough, MA (US); Gregory F. Jacobs, Oreland, PA (US)

(73) Assignee: CertainTeed Corporation, Malvern, PA (US)

(*) Notice: Subject to any disclaimer, the term of this patent is extended or adjusted under 35 U.S.C. 154(b) by 47 days.

(21) Appl. No.: 15/687,411

(22) Filed: Aug. 25, 2017

(65) Prior Publication Data

US 2017/0355611 A1  Dec. 14, 2017

Related U.S. Application Data

(62) Division of application No. 12/599,890, filed as application No. PCT/US2008/064674 on May 23, 2008, now abandoned.

(60) Provisional application No. 60/939,993, filed on May 24, 2007.

(51) Int. Cl.

| | | |
|---|---|---|
| *C01G 23/047* | (2006.01) | |
| *B82Y 30/00* | (2011.01) | |
| *C01G 9/02* | (2006.01) | |
| *C09C 1/04* | (2006.01) | |
| *C09C 1/36* | (2006.01) | |
| *E04D 7/00* | (2006.01) | |

(52) U.S. Cl.
CPC ............ *C01G 23/047* (2013.01); *B82Y 30/00* (2013.01); *C01G 9/02* (2013.01); *C09C 1/04* (2013.01); *C09C 1/3638* (2013.01); *E04D 7/005* (2013.01); *C01P 2004/50* (2013.01); *C01P 2004/61* (2013.01); *C01P 2004/62* (2013.01); *C01P 2004/64* (2013.01); *C01P 2004/80* (2013.01)

(58) Field of Classification Search
CPC ........ C01G 23/047; C01G 9/02; B82Y 30/00; C09C 1/04; C09C 1/3638; E04D 7/005
See application file for complete search history.

(56) References Cited

U.S. PATENT DOCUMENTS

| | | | |
|---|---|---|---|
| 2,591,149 A | 4/1952 | Grove | |
| 2,898,232 A | 8/1959 | Miller et al. | |
| 2,981,636 A | 4/1961 | Lodge et al. | |
| 3,507,676 A | 4/1970 | McMahon | |
| 5,356,664 A | 10/1994 | Narayan et al. | |
| 5,595,813 A | 1/1997 | Ogawa et al. | |
| 6,037,289 A | 3/2000 | Chopin et al. | |
| 6,143,318 A | 11/2000 | Gilchrist et al. | |
| 6,204,304 B1 | 3/2001 | Houlihan et al. | |

(Continued)

FOREIGN PATENT DOCUMENTS

| | | |
|---|---|---|
| KR | 101999015616 A | 3/1999 |
| WO | 2003085058 | 10/2003 |
| WO | 2008147971 A2 | 12/2008 |

OTHER PUBLICATIONS

U.S. Appl. No. 60133372 A, filed May 10, 1995, Wagner, et al.

(Continued)

*Primary Examiner* — James A Fiorito
(74) *Attorney, Agent, or Firm* — McDonnell Boehnen Hulbert & Berghoff LLP

(57) ABSTRACT

Photocatalytic roofing granules include a binder and inert mineral particles, with photocatalytic particles dispersed in the binder.

13 Claims, 3 Drawing Sheets

(56) References Cited

U.S. PATENT DOCUMENTS

| | | |
|---|---|---|
| 6,245,381 B1 | 6/2001 | Israel |
| 6,465,088 B1 | 10/2002 | Talpaert et al. |
| 6,569,520 B1 | 5/2003 | Jacobs |
| 6,881,701 B2 | 4/2005 | Jacobs |
| 6,881,702 B2 | 4/2005 | Arnold et al. |
| 7,067,445 B2 | 6/2006 | Webber et al. |
| 2004/0258835 A1 | 12/2004 | Hong et al. |
| 2006/0251807 A1 | 11/2006 | Hong et al. |

OTHER PUBLICATIONS

U.S. Appl. No. 60939993, filed May 25, 2008, Hong, et al.
International Search Report, PCT/US2008/064674, Won Jae Lee, dated Dec. 4, 2008.

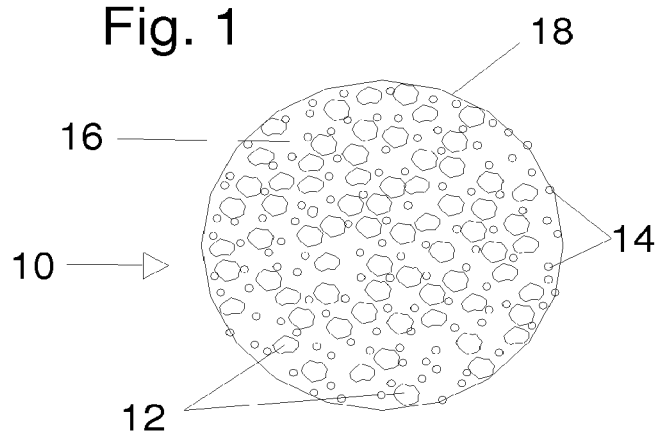
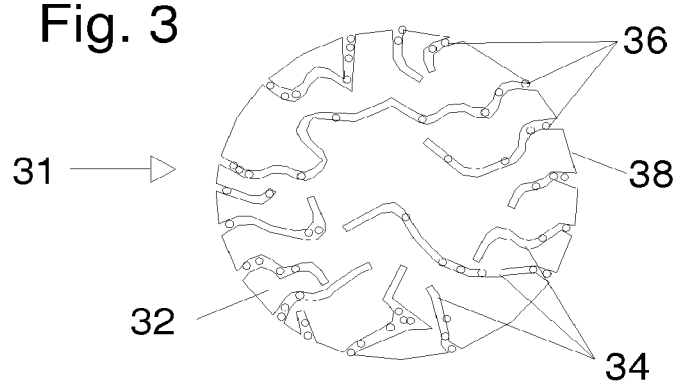
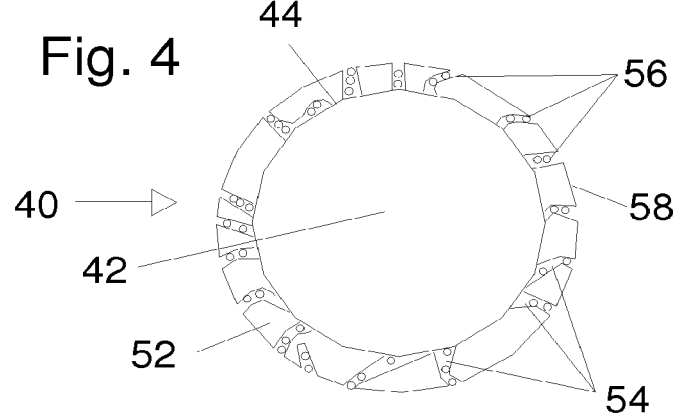

PHOTOCATALYTIC ROOFING GRANULES, PHOTOCATALYTIC ROOFING PRODUCTS, AND PROCESS FOR PREPARING SAME

CROSS-REFERENCE TO RELATED APPLICATIONS

This application is a divisional of application Ser. No. 12/599,890, filed Nov. 12, 2009, which is the National Stage of International Application No. PCT/US2008/064674, filed May 23, 2008, which claims the benefit of U.S. Provisional Application No. 60/939,993, filed May 24, 2007, which are all incorporated herein by reference in their entirety.

BACKGROUND OF THE INVENTION

1. Field of the Invention

The present application relates to roofing granules and roofing products including roofing granules.

2. Brief Description of the Prior Art

Asphalt shingles are conventionally used in the United States and Canada as roofing and siding materials. Roofing granules are typically distributed over the upper or outer face of such shingles. The roofing granules, in general formed from mineral materials, serve to provide the shingle with durability. They protect the asphalt from the effects of the solar radiation (in particular from the degradative effects of ultraviolet rays) and of the environment (wind, precipitation, pollution, and the like), and contribute to better reflection of incident radiation. The granules moreover are typically colored, naturally or artificially by way of the application of pigments, to meet the aesthetic requirements of the user.

However, it is not unusual to see unattractive green, brown or black spots appearing on the surface of asphalt shingles of buildings located in temperate climates. These spots are due to micro-organisms, mainly algae of the Gloeocapsa genus which benefit from conditions favorable to their growth found in temperate climates. These conditions include heat, moisture and nutrients. The essential biogenic salts may be provided by the mineral granules themselves, but also may be supplied by organic matter which settles on the shingles. The unattractiveness of these spots, all the more noticeable when the color of the shingle is a light one, is not the only disadvantage. In addition, the resulting darkening of the surface causes an increase in the absorption of the solar radiation, which in turn reduces the effectiveness of the shingles as thermal insulation, and decreases their service life.

To address this problem, algae-contaminated shingles can be treated with suitable biocides. However, the complete elimination of the algae is difficult, and requires the treatment of the entire building, including seemingly healthy surfaces. Even by using a powerful biocide such as sodium hypochlorite, the prophylactic effect is not permanent, because the roof is subsequently scrubbed by weather-borne water. Moreover, certain green algae particularly resistant to biocides can re-colonize previously treated surfaces, thus requiring additional treatments, at regular intervals, to limit their reappearance.

Other methods known to prevent the appearance of the undesirable algae growth are based on the incorporation of algaecide in the shingle. For example, it has been suggested that granules include metal compounds in the form of zinc oxide or sulfide (U.S. Pat. No. 3,507,676), or copper oxide (U.S. Pat. No. 5,356,664), or that a mixture copper oxide and zinc oxide (U.S. Patent Publication 2002/0258835 and U.S. Patent Publication 2002/0255548) can be incorporated in the asphalt.

It has also been suggested to disperse a granular or pulverulent material containing an algaecide on the surface of the shingle (JP-A-2004162482). U.S. Pat. No. 6,245,381 suggests adding a biocide in the form of salt or of chelate starting from $Cu^{2+}$, $Zn^{2+}$ and $Sn^{2+}$ ions complexed with an organic binder anion in asphalt during the manufacture of the shingle.

Another approach has been to employ photocatalytic particles as biocidal agents. The photocatalytic effect has been employed to provide self-cleaning glass and other ceramic materials. For example, U.S. Pat. No. 6,037,289 discloses a substrate provided with photocatalytic anatase titanium dioxide that is at least partially crystalline, and has a mean size of between 5 and 80 nm. The coating can include an inorganic binder, such as an amorphous or partially crystalline oxide, or mixture of oxides, such as oxides of silicon, titanium, tin, zirconium or aluminum, which can serve as a matrix for the photocatalytic titanium oxide. Alternatively, a partly organic binder can be used, such as a binder based on epoxide-containing alkoxysilanes. Similarly, U.S. Pat. No. 6,465,088 discloses a substrate such as a glass or acrylate glazing material covered with a photocatalytic coating including crystallized particles having photocatalytic properties and a mineral binder comprising at least one oxide of a metal having photocatalytic properties. U.S. Pat. Nos. 6,569,520 and 6,881,702 disclose a photocatalytic composition and method for preventing algae growth on building materials such as roofing granules. A plurality of photocatalytic particles, such as anatase titanium dioxide, is dispersed in a silicate binder to form an exterior coating for a substrate such as a roofing granule or concrete surface. At least a portion of some of the photocatalytic particles is exposed on the surface of the coating.

In general all these approaches aim to provide biocide at the surface of the roofing granules, but also require significant deviations from the conventional techniques for producing such granules, such as formulating, applying and curing one or more interior coatings including biocidal materials, adding functional components such as various biocidal materials to the exterior color coating composition used to provide color to the granules and the roofing shingles formed with such granules, and the like.

Functional materials are substances that confer special or desirable properties when added to a composition, such as coating composition. Biocides are an example of one class of functional materials. Another type of functional material encountered in the roofing granule art enhances the solar reflectance of the roofing granules. Some materials may have multiple functional characteristics.

Colored granules have been modified using functional materials to provide special functions to the granules and the shingles or membranes that contain these granules. The most common feature is algae resistance which relies on the metal oxides, such as cuprous oxide, to serve as the algaecides. Solar reflectance is another feature that has been added to the roofing granules by incorporating solar reflective or solar transparent pigments. The major disadvantage of these types of functionalized colored granules is the high cost—usually 10 to 20-fold more expensive than the standard colored granules. The main reason is a combination of complicated manufacturing processes in order to achieve the desired colors and properties, plus the high costs of raw materials (algaecides and/or solar reflective pigments).

There is a continuing need to prevent the appearance of undesirable algae growth on roofing shingles and other roofing materials in an efficient and cost-effective manner.

SUMMARY OF THE INVENTION

The present invention provides, an article, in particular a roofing granule, which is photocatalytic in and of itself without a coating.

In one presently preferred embodiment, the present invention provides photocatalytic roofing granules comprising a binder, inert mineral particles, and photocatalytic particles. In this embodiment, the inert mineral particles and the photocatalytic particles are dispersed in the binder. Preferably, the photocatalytic particles are selected from the group consisting of anatase titanium dioxide and zinc oxide. Further, it is preferred that the photocatalytic particles have an average particle size from about 5 nanometers to 5 microns, and more preferably from about 5 nanometers to 100 nanometers. Preferably, the inert mineral particles have an average particle size from about 0.1 micrometers to 40 micrometers and more preferably from about 0.25 micrometers to 20 micrometers. Preferably, the photocatalytic roofing granules have an average particle size from about 0.1 mm to 3 mm, and more preferably from about 0.5 mm to 1.5 mm. Preferably, the binder is selected from the group consisting of silicate, silica, phosphate, titanate, zirconate, and aluminate binders, and mixtures thereof. Preferably, the binder further comprises an inorganic material selected from the group consisting of aluminosilicate and kaolin clay.

In another presently preferred embodiment, the present invention provides photocatalytic roofing granules comprising a porous body comprising inert mineral particles, and photocatalytic particles within the pores of the body. In this embodiment, the photocatalytic particles are preferably selected from the group consisting of anatase titanium dioxide and zinc oxide. Preferably, the photocatalytic particles have an average particle size from about 5 nanometers to 5 microns, and more preferably from about 5 nanometers to 100 nanometers. Preferably, the inert mineral particles have an average particle size from about 0.1 micrometers to 40 micrometers and more preferably from about 0.25 micrometers to 20 micrometers. Preferably, the photocatalytic roofing granules have an average particle size from about 0.1 mm to 3 mm, and more preferably from about 0.5 mm to 1.5 mm. In one aspect, the porous body comprises a plurality of mineral particles and a binder, and the binder is preferably selected from the group consisting of silicate, silica, phosphate, titanate, zirconate, and aluminate binders, and mixtures thereof. Preferably, the binder in this aspect further comprises an inorganic material selected from the group consisting of aluminosilicate and kaolin clay.

In another aspect, the present invention provides a process for preparing photocatalytic roofing granules. In a first presently preferred embodiment, the process comprises providing a binder, inert mineral particles, and photocatalytic particles, dispersing the inert mineral particles and the photocatalytic particles in the binder to form a mixture, forming the mixture into granules, and curing the binder. In another presently preferred embodiment, the process comprises providing a binder and inert mineral particles to form a mixture; photocatalytic particles, forming the mixture into porous granules, curing the binder to form a porous granule body, and dispersing the photocatalytic particles in the pores of the granule body.

In another aspect, the present invention provides a process for preparing photocatalytic roofing granules in which the process comprises providing ceramic particles; forming the ceramic particles into uncured granule bodies having an exterior surface; sintering the uncured granule bodies to form sintered granule bodies; and adhering photocatalytic particles to the exterior surface of the sintered granule bodies to form photocatalytic roofing granules. In one embodiment of this aspect of the present invention, the process further includes providing a sintering binder and mixing the sintering binder with the ceramic particles to form a mixture and subsequently forming the mixture including the ceramic particles into uncured granule bodies. In one embodiment, the photocatalytic particles are mechanically adhered to the exterior surface of the uncured granule bodies. In an alternative embodiment, the process further comprises mixing the photocatalytic particles with an exterior binder to form an exterior coating composition; applying the exterior coating composition to the cured granule bodies; and curing the exterior coating composition.

In another aspect, the present invention provides photocatalytic roofing granules having an exterior surface, the roofing granules comprising sintered ceramic particles; and photocatalytic particles; wherein at least some of the photocatalytic particles are proximate the exterior surface of the roofing granules. Preferably, the photocatalytic particles are selected from the group consisting of anatase titanium dioxide and zinc oxide.

BRIEF DESCRIPTION OF THE DRAWINGS

FIG. 1 is a schematic sectional elevational representation of a roofing granule according to a first embodiment of the present invention.

FIG. 3 is a schematic sectional elevational representation of a roofing granule according to a third embodiment of the present invention.

FIG. 4 is a schematic sectional elevational representation of a roofing granule according to a fourth embodiment of the present invention.

DETAILED DESCRIPTION

Figure 2:
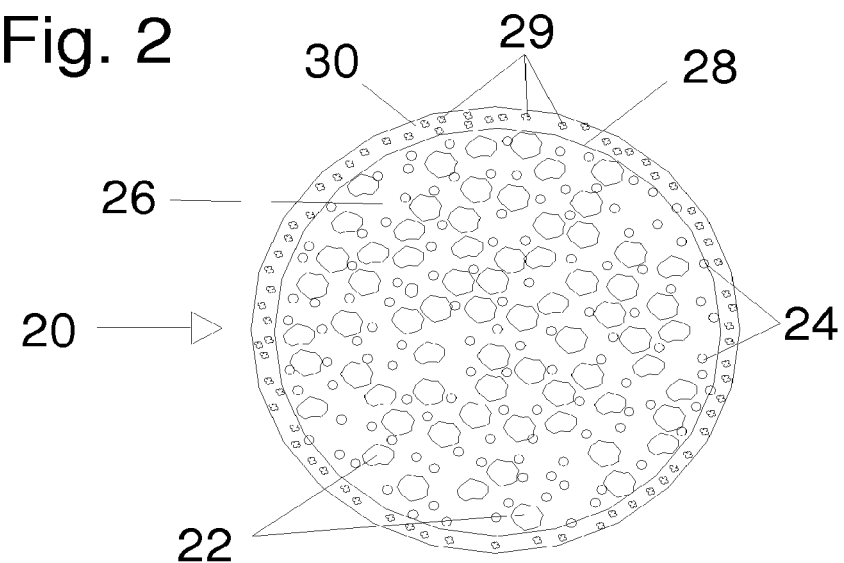
FIG. 2 is a schematic sectional elevational representation of a roofing granule according to a second embodiment of the present invention.

The present invention provides roofing granules which include a composite inorganic granule body and a plurality of photocatalytic particles, such as anatase form of titanium dioxide or zinc oxide, with particle sizes in nano-scale (5 to 100 nm) or larger (up to two microns).

In another embodiment, the present invention provides a composite granule body that includes porosity. The porosity of the granule body can be of different sizes, shapes and forms (interconnected or isolated porosity). In this embodiment, a plurality of photocatalytic particles is immobilized within the pore structures of the granule body. The photocatalytic particles can be introduced into the pores by blending of the photocatalytic particles with other ingredients during the granule body formation processes. Alternatively, a suspension of photocatalytic particles or a solution of photocatalytic titania sol can be mixed with the porous granule body, and the photocatalytic particles are drawn into the pores by capillary action.

The mineral particles employed in the process of the present invention are preferably chemically inert materials. The mineral particles preferably have an average particle size of from about 0.1 micrometers to about 40 micrometers and more preferably from about 0.25 micrometers to about 20 micrometers. Stone dust can be employed as the source of the mineral particles in the process of the present invention. Stone dust is a natural aggregate produced as a by-product of quarrying, stone crushing, machining operations, and similar operations. In particular, dust from talc, slag, limestone, granite, marble, syenite, diabase, greystone, quartz, slate, trap rock, basalt, greenstone, andesite, porphyry, rhyolite, greystone, and marine shells can be used, as well as manufactured or recycled manufactured materials such as ceramic grog, proppants, crushed bricks, concrete, porcelain, fire clay, and the like. Ceramic materials, such as silicon carbide and aluminum oxide of suitable dimensions can also be used.

"Green" or uncured photocatalytic roofing granules can be formed from a mixture of mineral particles, photocatalytic particles and binder, ranging from about 95% by weight binder to less than about 10% by weight binder, and the uncured photocatalytic roofing granules preferably are formed from a mixture that includes from about 10% to 40% by weight binder.

The binder can be a binder selected from the group consisting of silicate, silica, phosphate, titanate, zirconate, and aluminate binders, and mixtures thereof. The binder can further comprise an inorganic material selected from the group consisting of aluminosilicate and kaolin clay. In one aspect of the present invention, the binder is a soluble alkali metal silicate, such as aqueous sodium silicate or aqueous potassium silicate. The soluble alkali metal silicate is subsequently insolubilized by heat or by chemical reaction, such as by reaction between an acidic material and the alkaline silicate, resulting in cured photocatalytic roofing granules. The binder may also include additives for long term outdoor durability and functionality.

When an alkali metal-silicate binder such as sodium silicate is employed in the preparation of photocatalytic roofing granules, the binder can include a heat-reactive aluminosilicate material, such as clay, for example, kaolin clay. Alternatively, it is possible to insolubilize the alkali metal silicate binder chemically by reaction with an acidic material, for example, ammonium chloride, aluminum chloride, hydrochloric acid, calcium chloride, aluminum sulfate, and magnesium chloride, such as disclosed in U.S. Pat. Nos. 2,591,149, 2,614,051, 2,898,232 and 2,981,636, or other acidic material such as aluminum fluoride. The binder can also be a controlled release sparingly water soluble glass such as a phosphorous pentoxide glass modified with calcium fluoride, such as disclosed in U.S. Pat. No. 6,143,318. The most commonly used binder for conventional granule coating is a mixture of an alkali metal silicate and an alumino-silicate clay material.

The mixture of mineral particles, photocatalytic particles and binder can be formed into uncured photocatalytic roofing granules, using a forming process such as press, molding, cast molding, injection molding, extrusion, spray granulation, gel casting, pelletizing, compaction, or agglomeration. Preferably, the resulting uncured photocatalytic roofing granules have sizes between about 50 micrometers and 5 mm, more preferably between about 0.1 mm and 3 mm, and still more preferably between about 0.5 mm and 1.5 mm. The uncured photocatalytic roofing granules can be formed using a conventional extrusion apparatus. For example, aqueous sodium silicate, kaolin clay, mineral particles, and photocatalytic particles and water (to adjust mixability) can be charged to a hopper and mixed by a suitable impeller before being fed to an extrusion screw provided in the barrel of the extrusion apparatus. Alternatively, the ingredients can be charged to the extruder continuously by gravimetric feeds. The screw forces the mixture through a plurality of apertures having a predetermined dimension suitable for sizing roofing granules. As the mixture is extruded, the extrudate is chopped by suitable rotating knives into a plurality of uncured photocatalytic roofing granules, which are subsequently fired at an elevated temperature to sinter or density the binder.

When the formed granules are fired at an elevated temperature, such as at least 250 degrees C., and preferably at 400 to 800 degrees C., the clay binder densities to form strong particles.

Examples of clays that can be employed in the process of the present invention include kaolin, other aluminosilicate clays, Dover clay, bentonite clay, etc.

Examples of photocatalytic particles that can be employed in forming the photocatalytic roofing granules of the present invention include photocatalytic titanium oxide such as anatase titanium dioxide, photocatalytic copper oxide, photocatalytic vanadium oxide, and photocatalytic zinc oxide. Preferably, the photocatalytic particles comprise at least one photocatalytic particulate, preferably a metal oxide, comprising from about 0.1 to 20% by weight of the photocatalytic roofing granules. Moreover, it is preferred that the photocatalytic particles have an average particle size of from 1 nm to 60 nm as determined by light scattering. Preferably, the at least one photocatalytic particulate is anatase titanium dioxide.

Preferably, the photocatalytic particles are selected to have high photoefficiency. In particular, the grain size and crystal phase of the particles are preferably selected to enhance photoactivity. Further, the photocatalytic particles or particulate preferably include selected dopants to enhance photoactivity. For example, when the photocatalytic particulate is nanocrystalline titanium dioxide, the particulate can be prepared as the anatase crystal phase, the particulate can be prepared as a mesoporous material, Fe(III), Nb(V), V(V) Pt and like dopants may be included, noble metal nanodomains may be included, the surface of the titanium dioxide can be treated to enhance diffusion of oxidizing species from the surface, and the like.

In yet another aspect of the present invention, the binder comprises a chemically bonded cement, preferably, a chemically bonded phosphate cement. It is preferred in this aspect that the binder comprise a chemically bonded phosphate cement prepared from a cementitious exterior coating composition including at least one metal oxide or a metal hydroxide slightly soluble in an acidic aqueous solution to provide metal cations and a source of phosphate anions. Preferably, the relative quantities of the at least one metal oxide or metal hydroxide and at least one source of phosphate anion are selected to provide a cured coating having a neutral pH, the coating composition being cured by the acid-base reaction of the at least one metal oxide or hydroxide and the source of phosphate anions. Preferably, in this aspect the binder comprises at least one metal oxide or metal hydroxide as a source of metal cations and at least one phosphate. Preferably, at least one metal oxide or metal hydroxide comprises at least one clay. Preferably, the binder further includes colloidal silica.

Preferably, the at least one metal oxide or metal hydroxide is selected from the group consisting of alkali metal oxides, alkaline earth metal hydroxides, aluminum oxide, oxides of first row transition metals, hydroxides of first row transition metals, oxides of second row transition metals, and hydroxides of second row transition metals. More preferably, the at least one metal oxide or metal hydroxide is selected from the group consisting of magnesium oxide, calcium oxide, iron oxide, copper oxide, zinc oxide, aluminum oxide, cobalt oxide, zirconium oxide and molybdenum oxide. Preferably, the at least one metal oxide or metal hydroxide is sparingly soluble in an acidic aqueous solution. In addition, it is preferred that the at least one metal oxide or metal hydroxide comprise from about 10 to 30% by weight of the binder.

Preferably, the at least one phosphate is selected from the group consisting of phosphoric acid and acid phosphate salts. More preferably, the at least phosphate is selected from the group consisting of phosphoric acid, and acid salts of phosphorous oxo anions, and especially salts including at least one cation selected from the group consisting of ammonium, calcium, sodium, potassium, and aluminum cations. In particular, it is preferred that the at least one phosphate be selected from the group consisting of phosphoric acid, ammonium hydrogen phosphate, ammonium dihydrogen phosphate, potassium hydrogen phosphate, potassium dihydrogen phosphate, potassium phosphate, calcium hydrogen phosphate, calcium dihydrogen phosphate, magnesium hydrogen phosphate, sodium hydrogen phosphate, sodium dihydrogen phosphate, aluminum hydrogen phosphate, aluminum dihydrogen phosphate, and mixtures thereof. Commercial grades of calcium phosphate salts, such "NSP" (normal super phosphate) and "TSP" (triple super phosphate) can also be used. Potassium dihydrogen phosphate ("monopotassium phosphate"), aluminum hydrophosphate ($AlH_3(PO_4) \cdot 2H_2O$), monoaluminum phosphate ($Al(H_2PO_4)_3$) and magnesium dihydrogen phosphate are especially preferred. Preferably, the at least one phosphate comprises from about 10 to 60% by weight of the binder.

In this aspect of photocatalytic roofing granules according to the present invention, the cure of the binder depends on the composition of the chemically bonded cement. A broad range of cure conditions, ranging from rapid room temperature curing to low energy cures at moderately elevated temperatures to high energy cures at more elevated temperatures can be attained by varying the metal oxide or hydroxide and the phosphate. Optionally, the reactivity of the metal oxide or hydroxide can be reduced by calcining the metal oxide or metal hydroxide prior to preparing the binder. In addition, the pot life of the binder can be extended by the optional addition of a retardant such as boric acid.

Thus, in one aspect the present invention provides a process for preparing photocatalytic roofing granules. In this aspect, the process comprises providing a binder, inert mineral particles, and photocatalytic particles; dispersing the inert mineral particles and the photocatalytic particles in the binder to form a mixture; forming the mixture into granules; and curing the binder.

In one presently preferred embodiment of the present invention, porous base particles are provided. Particle synthesis allows properties of the photocatalytic roofing granules to be tailored, such as the porosity of the granule and the distribution of the photocatalytic particles. The base particles are preferably prepared by mixing mineral particles with a suitable binder, such as a binder comprising an aluminosilicate material, such as clay (which is also, formally, composed of "mineral particles," but not as that term is used herein).

In another aspect of the present invention, photocatalytic roofing granules are produced by an accretion process such as disclosed in U.S. Pat. No. 7,067,445, incorporated herein in its entirety by reference. The starting materials employed are mineral particles and binder, and optionally photocatalytic particles. The starting materials are preferably ground, if necessary, by ball milling or another attrition process, to form particles having a mean particle size of about 20 microns or less, more preferably, about 15 microns or less, and most preferably about 10 microns or less, expressed in terms of particle diameter (or average diameter for non-spherical particles). The ground starting materials are combined with a liquid, such as water, and mixed in an intensive mixer, such as an Eirich mixer (Eirich Machines Inc., Gurnee, Ill. 60031) having a rotatable confinement vessel having a rotatable table, or pan, and a rotatable impacting impeller. In an intensive mixer the rotatable table and impeller rotate in opposite directions. Sufficient water or other liquid is added to cause essentially spherical pellets of the starting material mixture to be formed (about 15 to 40 weight percent water based on the starting materials). After such pellets have formed, a second mixture is added, and the mixture is further operated to cause accretion of the added material to the pellets being formed. The second mixture includes photocatalytic particles and binder, and optionally mineral particles and colorant material particles. The second mixture preferable comprises up to 25 percent, and more preferably, from about 5 to 15 percent by weight, of the starting materials. The pellet so formed are then dried to a moisture content of less than about 10 weight percent, for example, in a drier at a temperature between about 100 degrees C. and 300 degrees C. to form "green" roofing granules. The "green" roofing granules so formed are subsequently cured. Depending on the nature of the binder, the "green" granules can be cured by heating at an elevated temperature to cure the binder. For example, when the binder comprises aqueous sodium silicate and kaolin clay, the "green" granules can be cured by heating at a temperature between about 400 degrees C. and 800 degrees C. to solidify the binder.

In another aspect of the present invention, photocatalytic roofing granules are produced by an accretion process similar to that disclosed in U.S. Pat. No. 7,067,445. In this aspect of the present invention, the starting materials employed are ceramic particles and a sinter binder, and optionally photocatalytic particles.

Suitable ceramic particles include oxides, such as aluminum oxides, such as alumina, silicon oxides, such as silica, and mixtures thereof. Preferably, the ceramic particles comprise silica and alumina, and comprise at least 80 percent by weight of the starting materials, expressed in terms of the calcined (essentially anhydrous) weight, and more preferably, at least about 90 percent of the calcined weight.

"Calcined" as used herein refers to a heating process to which a material has been subjected to release water and other volatiles from the material, such as organic materials and chemically bound water such water of hydration. Ore materials that have been fully calcined exhibit very low loss on ignition ("LOI") and moisture content, for example, about 1 to 2 percent by weight or less. Uncalcined ore materials such as bauxites and clays can contain from about 10 to about 40 percent volatiles. "Partially calcined" material typically exhibit total volatiles (LOI and moisture content) of about 5 to 8 percent. Typical calcination temperatures are usually less than 1000 degrees C.

The ceramic particles can be clays (predominantly hydrated alumina) such as kaolin, diaspore clay, burley clay, flint clay, bauxitic clays, nature or synthetic bauxites, mixtures thereof and the like. The ceramic particles can be calcined or partially calcined. The ceramic particles are preferably formed from oxides, aluminates, and silicates, and preferably comprise up to 50 percent by weight, more preferably at least 90 percent by weight, and most preferably at least 90 percent by weight of the starting materials.

The starting materials can also include various sintering aids, such as bentonite clay, iron oxide, boron, boron carbide, aluminum diboride, boron nitride, boron phosphide, other boron compounds, or fluxes such as sodium carbonate, lithium carbonate, titania, calcium carbonate, and sodium silicate, which materials can be added in amounts up to about 10 percent by weight to aid in sintering.

In addition, a sintering binder, such as wax, a starch, or resin, such as gelatinized cornstarch, polyvinyl alcohol, or mixture thereof, can be added to the initial mixture to aid in pelletizing the mixture and increase the green strength of the pellets prior to sintering. The sintering binder can be added in an amount of about 0 to 6 percent by weight of the starting materials.

The starting materials are preferably ground, if necessary, by ball milling or another attrition process, to form particles having a mean particle size of about 20 microns or less, more preferably, about 15 microns or less, and most preferably about 10 microns or less, expressed in terms of particle diameter (or average diameter for non-spherical particles). The ground starting materials are combined with a liquid, such as water, and mixed in an intensive mixer. Sufficient water or other liquid is added to cause essentially spherical pellets of the starting material mixture to be formed (about 15 to 40 weight percent water based on the starting materials). After such pellets have formed, a second mixture is added, and the mixture is further operated to cause accretion of the added material to the pellets being formed. The second mixture includes photocatalytic particles and sintering binder, and optionally ceramic particles, sintering aid, and colorant material particles. The second mixture preferable comprises up to 25 percent, and more preferably, from about 5 to 15 percent by weight, of the starting materials. The pellet so formed are then dried to a moisture content of less than about 10 weight percent, for example, in a drier at a temperature between about 100 degrees C. and 300 degrees C. to form "green" roofing granules.

The "green" roofing granules so formed are subsequently sintered in a furnace at a sintering temperature until a specific gravity of from about 2.1 to 4.1 grams per cubic centimeter is obtained, depending on the composition of the starting materials, and the desired specific gravity of the roofing granules. Sintering generally causes a reduction of up to about 20 percent in pellet size as well as an increase in specific gravity. Suitable sintering temperatures are generally about 1150 degrees C. and above, more preferably at about 1300 degrees C., still more preferably about 1500 degrees C., although sintering temperatures can be as high as 1600 degrees C.

Preferably, the curing or sintering temperature is selected so as to avoid loss or reduction of the photocatalytic activity of the photocatalytic particles. For example, when the photocatalytic particles comprise anatase titanium dioxide, it is preferred to employ a sintering or curing temperature less than about 900 degrees C. to avoid a phase change to the rutile crystal structure.

In another aspect of the present invention, porous base particles are formed, and photocatalytic particles are subsequently introduced into the pores of the porous base particles. The porous base particles can be formed from a mixture of a binder and mineral particles, such as described above, and at least one void-forming material. The at least one void-forming material can be an organic material or inorganic compound. Preferably, the void-forming material is selected so that it releases gaseous material, such as by decomposing into gaseous products, at suitably elevated temperatures. The void-forming material preferably releases gaseous material at a temperature that is greater than 90 degrees C. The void-forming material may, for example, release bound water, or water of hydration, at the elevated temperature. In the alternative, the void-forming material may itself decompose at an elevated temperature, preferably at a temperature above about 150 degrees C. Examples of void-forming materials include sugar, sugar-based products such as candy "sprinkles," crushed nuts (such as walnut shells), crushed corn and grains, carbon or graphite balls, synthetic and natural polymers, organic fibers, flame-retardants, organic peroxides and hydrated compounds. The void-forming material can be either water-soluble or water-insoluble. Preferably, the void-forming material comprises at least 0.1 percent by weight of the base particles employed to prepare the photocatalytic roofing granules. Preferably, the void-forming material has an average particle size no larger than about 2 mm. The void-forming material preferably has an average particle size from about 100 micrometer to about 400 micrometer. Mixtures of void-forming materials can also be used, as well as mixture of water-soluble and water-insoluble void-forming material. The proportions of mixtures of void-forming materials can be tailored to achieve desired porosity characteristics for the resulting base particles. The void-forming material preferably comprises a substance selected from the group consisting of ground walnut shells, sugar, and carbon black. In one presently preferred embodiment of the present invention, the void-forming material comprises about 1.4 percent by weight of the base particles.

In this aspect of the present invention, the base particles are formed from the mineral particles, the at least one void-forming material, and the binder, and the binder is cured, such as by firing at an elevated temperature, to provide inert, porous base particles. The porous base particles can then be treated with a suspension or slurry of photocatalytic particles in a suitable medium, which is drawn into the porous base particles by capillary action. The suspension medium is subsequently removed, as by drying, to form photocatalytic roofing granules.

In yet another aspect of the present invention, an inert core material is covered with a coating composition of a mixture of binder, mineral particles, and at least one void-forming material, and the coating composition is cured to provide base particles having a solid inert mineral core and a porous exterior coating. Photocatalytic particles are subsequently introduced into the pores of the exterior coating.

The inert mineral core material can be a suitably sized mineral particle such as described above, or in the alternative, the mineral core material can be a solid or hollow glass spheres. Solid and hollow glass spheres are available, for example, from Potters Industries Inc., P. O. Box 840, Valley Forge, Pa. 19482-0840, such as SPHERIGLASS® solid "A" glass spheres product grade 1922 having a mean size of 0.203 mm, product code 602578 having a mean size of 0.59 mm, BALLOTTINI impact beads product grade A with a size range of 600 to 850 micrometers (U.S. sieve size 20-30), and QCEL hollow spheres, product code 300 with a mean particle size of 0.090 mm. Glass spheres can be coated or treated with a suitable coupling agent if desired for better adhesion to the binder of the coating composition.

Referring now to the drawings, in which like reference numerals refer to like elements in each of the several views, there are shown schematically in FIGS. 1, 2, 3, 4, and 5 examples of photocatalytic roofing granules according to the present invention. FIG. 1 is a schematic cross-sectional representation of a first embodiment of photocatalytic roofing granule 10 according to the present invention. The photocatalytic roofing granule 10 comprises a plurality of inert mineral particles 12 and photocatalytic particles 14 dispersed in a binder 16. The inert mineral particles 12 and binder 16 together comprise a composite inorganic granule body. The photocatalytic roofing granule 10 has an exterior surface 18. Photocatalytic activity is provided to the photocatalytic roofing granule 10 by virtue of the photocatalytic particles 14 provided at or proximate the exterior surface 18 of the photocatalytic roofing granule 10. The photocatalytic roofing granule 10 can be formed by extrusion, agglomeration, roll compaction or other forming techniques. While the photocatalytic roofing granule 10 is shown schematically as a sphere in FIG. 1, photocatalytic roofing granules according to the present invention can assume any regular or irregular shape. After formation, depending on binder chemistry, the photocatalytic roofing granule 10 can be fired at 250 degrees C. or higher, preferably from 400 degrees C. to 800 degrees C., to insolubilize the binder 16. The particle size of the photocatalytic roofing granule 10 preferably ranges from about 0.1 mm to 3 mm, and more preferably from about 0.5 mm to 1.5 mm. The inert mineral particles 12 are minute particulates or dust, such as for example, particulates of rhyolite, syenite and other rock sources formed as a byproduct from quarry, crushing and similar operations. The inert mineral particles 12 preferably have a particle size ranging from about 0.1 micrometer to 40 micrometers, and more preferably from about 0.25 micrometer to 20 micrometers. The binder 16 is preferably selected from the group consisting of silicate, silica, phosphate, titanate, zirconate and aluminate binders, and mixtures thereof. The binder content of the photocatalytic roofing granule 10 preferably ranges from 10% to 90% by weight. In addition, aluminosilicate, kaolin clay and other inorganic materials can be added to the binder 16 to improve the mechanical, chemical, or physical properties of the photocatalytic roofing granule 10.

Figure 2A:
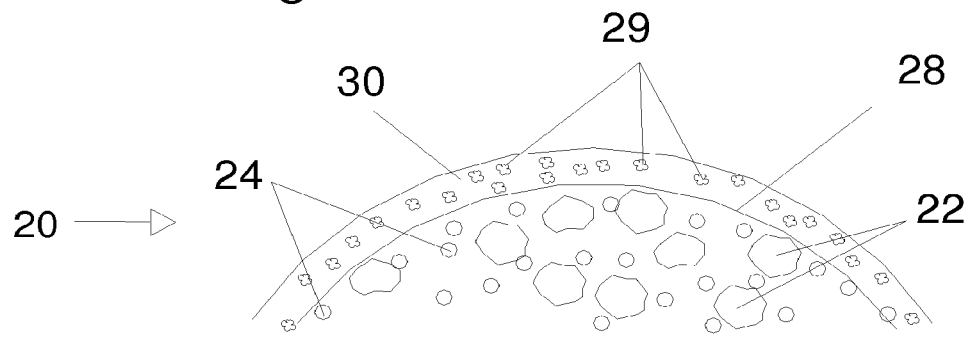
FIG. 2a is a partial fragmentary schematic sectional elevational representation of the roofing granule of FIG. 2.

FIG. 2 is a schematic cross-sectional representation of a second embodiment of photocatalytic roofing granule 20 according to the present invention. The photocatalytic roofing granule 20 comprises a plurality of inert mineral particles 22 and photocatalytic particles 24 dispersed in a binder 26, and has an inner surface 28, and an exterior coating layer 30 formed on the inner surface 28. The exterior coating layer 30 is substantially transparent to ultraviolet radiation, such as, for example, at least 80 percent transparent to ultraviolet radiation. The exterior coating layer 30 can be formed, for example, from a curable coating composition such as disclosed in International Patent Publication WO/2003/085058 comprising an organohydrogenpolysiloxane, an alkenyl functional polysiloxane, and an ultraviolet radiation absorbing photocatalyst, or such as disclosed in U.S. Pat. No. 6,204,304, incorporated herein by reference, and providing an exterior coating layer 30 having a high level of transparency to ultraviolet radiation, such as a coating that allows from 70% to 99% of radiation of wavelengths from 240 nm to 275 nm to pass through. Preferably, the exterior coating layer 30 is thin enough to permit photocatalytic particles 24 proximate the inner surface 28 to provide photocatalytic action at the surface of the photocatalytic roofing granules 20. For example, the exterior coating layer 30 has a thickness of from about 20 micrometers to 200 micrometers. The exterior coating layer 30 can also include particulate colorants 29 or dyes to provide desired aesthetic effects, better seen in the partial fragmentary schematic cross-sectional view of FIG. 2a.

FIG. 3 is a schematic cross-sectional representation of a third embodiment of a photocatalytic roofing granule 31 according to the present invention. The photocatalytic roofing granule 31 comprises an inert composite mineral body or granule body 32 having a plurality of pores 34 formed therein, and a plurality of photocatalytic particles 36 dispersed in the pores 34, and an exterior surface 38. Photocatalytic activity is provided to the photocatalytic roofing granule 31 by virtue of the photocatalytic particles 36 provided at or proximate the exterior surface 38 of the photocatalytic roofing granule 31. FIG. 4 is a schematic cross-sectional representation of a fourth embodiment of a photocatalytic roofing granule 40 according to the present invention. The photocatalytic roofing granule 40 comprises an inert mineral base particle 42 having an outer surface 44 coated with an inert mineral layer 52 having a plurality of pores 54 formed in the inert mineral layer 52, and a plurality of photocatalytic particles 56 dispersed in the pores 54. Photocatalytic activity is provided to the photocatalytic roofing granule 40 by virtue of the photocatalytic particles 56 provided at or proximate the exterior surface 58 of the photocatalytic roofing granule 40.

Figure 5:
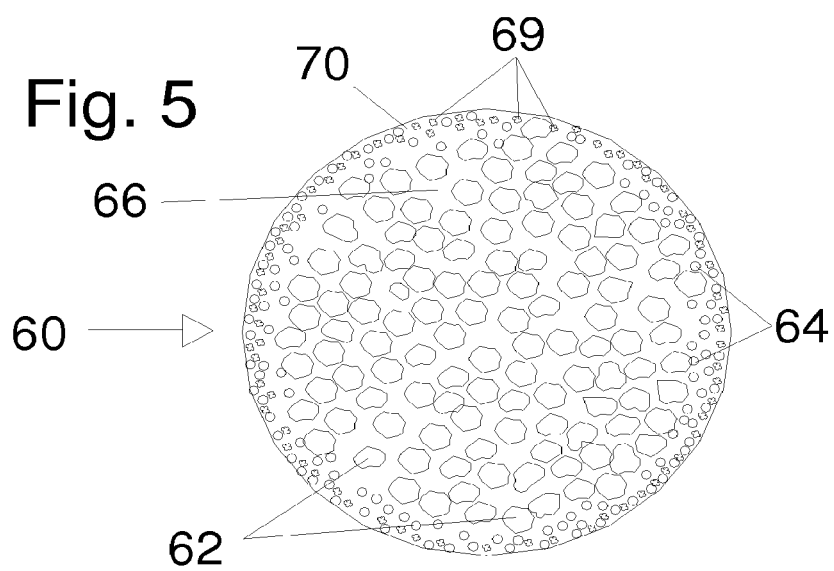
FIG. 5 is a schematic sectional elevational representation of a roofing granule according to a fifth embodiment of the present invention.
Figure 5A:
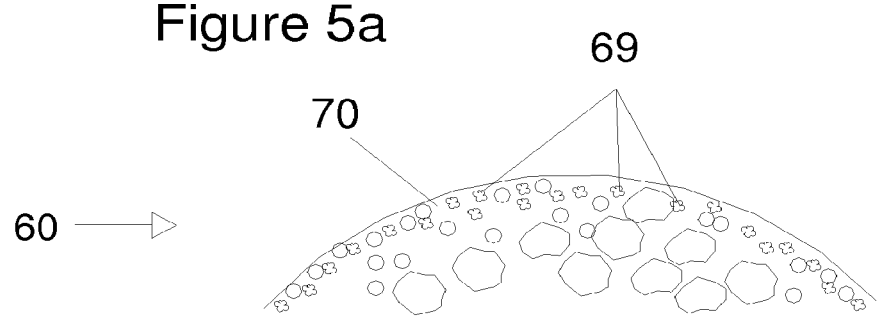
FIG. 5a is a partial fragmentary schematic sectional elevational representation of the roofing granule of FIG. 6.

FIG. 5 is a schematic cross-sectional representation of a fifth embodiment of photocatalytic roofing granule 60 according to the present invention. The photocatalytic roofing granule 60 comprises a plurality of inert mineral particles 62 and dispersed in a binder 66 as well as an exterior layer 70 of photocatalytic particles 64 dispersed in binder 66 proximate the surface of the roofing granule 60, and formed by a particle accretion process in an intensive mixer. The exterior layer 70 can have a thickness of from about 20 micrometers to 200 micrometers. The exterior layer 70 can also include particulate colorants 69 or dyes, better seen in the partial fragmentary view of FIG. 5a. In another aspect of this embodiment, the inert mineral particles 62 can comprise ceramic particles which are mixed with a sintering binder, formed into green cores by an agglomeration process (not shown). The green cores are subsequently sintered together at elevated temperature to form sintered cores, to which cores are subsequently adhered photocatalytic particles, such as by mixing photocatalytic particles with an exterior binder to form an exterior coating composition which is subsequently applied to the exterior of the sintered cores and cured (not shown).

Figure 6:
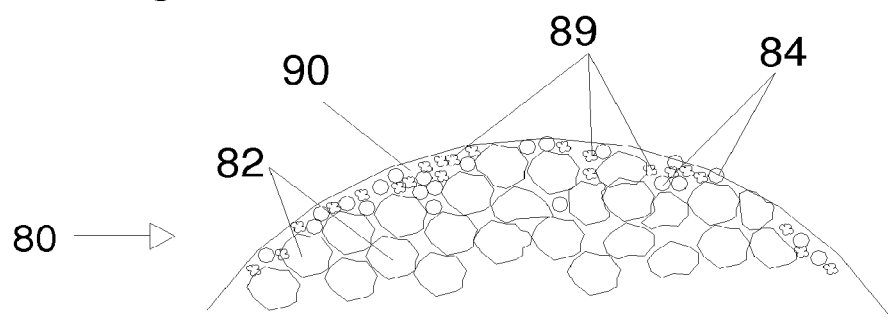
FIG. 6 is a partial fragmentary schematic sectional elevational representation of a roofing granule according to a sixth embodiment of the present invention.

FIG. 6 is a fragmentary schematic cross-sectional representation of a sixth embodiment of photocatalytic roofing granule 80 according to the present invention. The photocatalytic roofing granule 80 comprises a plurality of sintered ceramic particles 82 as an exterior layer 90 of photocatalytic particles 84 sintered to the ceramic particles 82 proximate to the surface the roofing granule 80, and formed by a particle accretion process in an intensive mixer to form green pellets, followed by sintering at an elevated temperature. The exterior layer 90 can have a thickness of from about 20 micrometers to 200 micrometers. The exterior layer 90 can also include particulate colorants 89, sintered to the ceramic particles 82 and/or photocatalytic particles 84.

The photocatalytic roofing granules of the present invention can be employed in the manufacture of roofing products, such as asphalt shingles, using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The photocatalytic roofing granules of the present invention can be mixed with conventional roofing granules, and the granule mixture can be embedded in the surface of such bituminous roofing products using conventional methods. Alternatively, the photocatalytic roofing granules of the present invention can be substituted for conventional roofing granules in manufacture of bituminous roofing products.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Roofing granules are then distributed over selected portions of the top of the sheet, and the bituminous material serves as an adhesive to bind the roofing granules to the sheet when the bituminous material has cooled. The sheet can then be cut into conventional shingle sizes and shapes (such as one foot by three feet rectangles), slots can be cut in the shingles to provide a plurality of "tabs" for ease of installation and aesthetic effect, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products. Alternatively, the sheet can be formed into membranes or roll goods for commercial or industrial roofing applications.

The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

Various modifications can be made in the details of the various embodiments of the processes, compositions and articles of the present invention, all within the scope and spirit of the invention and defined by the appended claims.

The invention claimed is:

1. A process for preparing a photocatalytic roofing granule, the process comprising:
    (a) providing a porous granule body comprising inert mineral particles bound together with a binder; and then
    (b) providing photocatalytic titanium dioxide or vanadium oxide particles within the pores of the porous granule body by
        treating the porous granule body with a suspension or slurry of photocatalytic titanium dioxide or vanadium oxide particles in a volatile medium, the suspension or slurry being drawn into the pores of the porous granule body by capillary action; and
        subsequently removing the volatile medium by drying to form the photocatalytic roofing granule,
    wherein the providing of the photocatalytic titanium dioxide or vanadium oxide particles within the pores of the porous granule body does not form a coating on the porous granule body.

2. The process according to claim 1 wherein the photocatalytic particles are titanium dioxide particles.

3. The process according to claim 1 wherein the photocatalytic particles have an average particle size from about 5 nanometers to 5 microns.

4. The process according to claim 1 wherein the photocatalytic particles have an average particle size from about 5 nanometers to 100 nanometers.

5. The process according to claim 1, wherein said step of providing a porous granule body comprises:
    (a) providing a binder and inert mineral particles to form a mixture;
    (b) forming the mixture into porous granules;
    (c) curing the binder to form the porous granule body.

6. The process according to claim 5 wherein the mixture further comprises a void-forming material that is selected so that it releases gaseous material during the provision of the porous granule body, the release of gaseous material leaving behind pores.

7. The process according to claim 6 wherein the void-forming material releases gaseous material at a temperature that is greater than 90 degrees C.

8. The process according to claim 6, wherein the void-forming material has an average particle size in the range of 100 to 400 micrometers.

9. The process according to claim 1, wherein the photocatalytic particles are particles of photocatalytic vanadium oxide.

10. The process according to claim 1, wherein the photocatalytic particles are particles of photocatalytic anatase titanium dioxide.

11. The process according to claim 1, wherein the photocatalytic particles are present in the photocatalytic roofing granule in an amount in the range of 0.1-20% by weight.

12. The process according to claim 1, wherein the photocatalytic particles have an average particle size in the range of 1-60 nm.

13. The process according to claim 1, wherein the photocatalytic particles are anatase titanium dioxide particles having an average particle size from about 5 nanometers to 100 nanometers.

* * * * *